Patented Jan. 2, 1923.

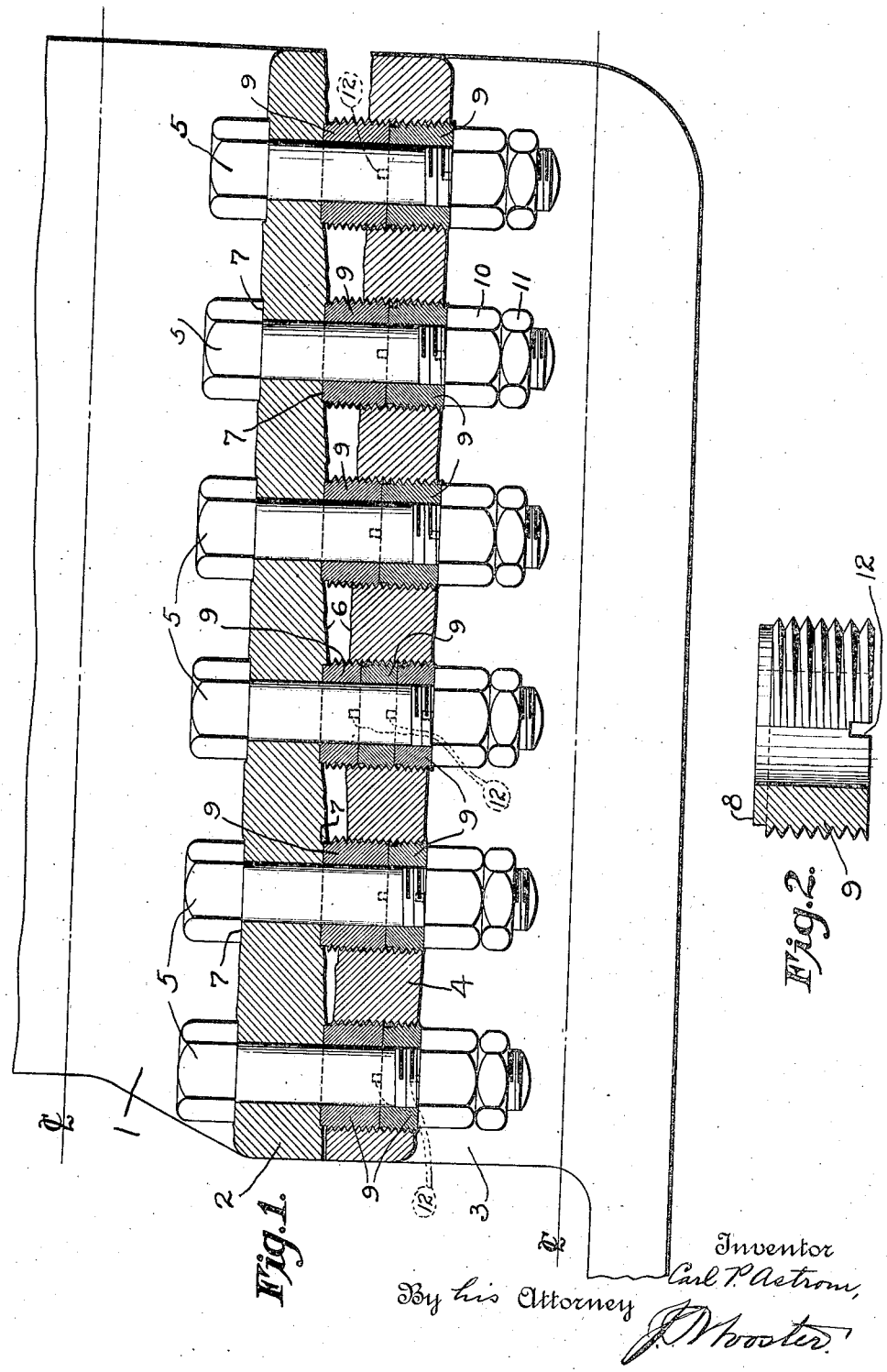

1,440,576

UNITED STATES PATENT OFFICE.

CARL P. ASTROM, OF EAST ORANGE, NEW JERSEY, ASSIGNOR TO M. H. TREADWELL COMPANY, A CORPORATION OF NEW YORK.

METAL STRUCTURE AND METHOD OF SECURING PARTS.

Application filed July 3, 1920. Serial No. 393,815.

*To all whom it may concern:*

Be it known that I, CARL P. ASTROM, a citizen of the United States, and resident of East Orange, in the county of Essex and State of New Jersey, have invented certain new and useful Improvements in Metal Structures and Methods of Securing Parts, of which the following is a specification.

This invention relates to improvements in metal structure, and has for its object to provide apparatus and a method whereby the expense of joining two pieces of metal by fitted plane surfaces is reduced, and enabling equally strong joints to be produced.

In joining machine parts, especially in heavy machine frames, castings, etc., much expense is involved at present in planing abutting surfaces to be thereafter fastened by means of bolts or rivets set in holes drilled through the pieces. In many structures of this general type, much expense can be saved without sacrifice of strength by enabling the pieces to be fastened without planing.

According to this invention two castings can be firmly secured together without using planed surfaces, this being accomplished solely in drilling and tapping operations without necessitating repeated handling of the pieces, and with as much accuracy as if ordinary methods of planing and then drilling be employed.

In carrying out the invention the usual method of drilling by means of jigs or other means for securing proper spacing of the fastening holes is employed, but instead of drilling both pieces with the same size hole one piece is drilled with a larger hole and this is tapped to receive threaded bushings having a larger diameter sufficient to receive the fastening bolt or rivet. To provide proper seating for the bushing where it bears on the other piece, the latter is simply spot faced, which is a common operation frequently done today by providing a drill with a spot facer, or in simple second operation. The process of fastening the two pieces is then completed by placing the two pieces in the relation they are to occupy permanently, then screwing the bushings through the threaded holes until they seat in the spot facings in the other piece, then inserting the fastenings, and setting. In practice it is found that the piece carrying the bushings is not weakened by reason of the larger holes since the threads on the bushings are sufficiently strong to carry tensional strains, and the bushings, usually seated in the spot facings, have equal, if not greater resistance to shearing forces.

In carrying out this method, present standards of bolt or rivet diameter to the thickness of the pieces to be fastened can be followed, so that it will not be necessary to redesign either fastenings or the parts to be fastened. Thereby, a large number of expensive planing and other fitting operations now employed are dispensed with, at a considerable saving in total expense, without weakening the structure in any way.

In the accompanying drawing,

Figure 1 is a section of a structure, embodying the invention, and

Figure 2 is a detail of a bushing to be employed.

Referring to Figure 1, 1 represents, for example, a steel casting having a flange 2, to be secured to a similar casting 3, having a flange 4 by means, for example, of standard bolts 5, whose diameter is generally determined by the character of service to be performed and the thickness of the pieces, as flanges 2, 4, to be fastened. Both pieces as herein shown, are provided with somewhat exaggerated irregular abutting surfaces 6, it being understood that present foundry practice is sufficiently accurate as to only leave a fraction of an inch of irregularities to be taken care of.

One piece, as 2, is then drilled with holes to receive the bolts 5 and spot faced as at 7, so as to form seats for the finished reduced ends 8 of the bushings or spacing members 9. The bushings are of such diameter and length as to have a substantial engagement in the piece 4, of tensile strength at least equal to the fastening, so that the bushing will not strip. The piece 4 is drilled and then tapped to receive the bushings. After these drilling, spot facing and tapping operations are completed, it is then only necessary to position the two pieces in permanent relation, then to screw in one or more bushings until the holes are filled up, with the ends 8 of the bushings seated in the spot facings 7, then to insert the bolts 5 and set up the nuts 10 with or without lock nuts 11.

In practice, sets of these bushings in three lengths as shown in Figure 1, will be provided for each one or more standard diameters of fastening, as with this range of three lengths practically all irregularities can be taken care of. In most instances, one or perhaps two bushings of different lengths in one hole will suffice, as a variation of one quarter of an inch will generally be excessive, although where specially large variations are to be taken care of, special long bushings can be provided. In some instances bushings can be omitted from some of the fastenings, but this is not generally good practice, as it puts an unnecessary strain upon the unsupported casting or plate. Where the bushing is employed and properly seated, the pieces bear as firmly on each other as if planed surfaces were used. Each bushing is commonly provided with opposite notches or castellations, 12, for turning. It will further be seen that in work to which this invention is largely applicable, projection of the bushings above one of the pieces makes no difference, nor will a slight depression of a bushing below the surface make any difference, but in order to avoid difficulties of this kind, the outside diameters of the bushings will generally slightly exceed the maximum diameters of the nuts 10, so that nuts or studs can be properly turned up, even if the outer end of the bushing is not flush with or above the surface of its carrying piece.

An important feature of the invention resides in the interlocking of the bushings with one of the pieces, as otherwise there is practically no fastening. The invention is also to be distinguished from the common practice of shimming, or using washers, wedges, etc., between two pieces, as these are not accurate, rather difficult to insert, or else loosen under vibration, and are generally unreliable, whereas the spot facing insures that an accurate bearing of the bushing will always be had, no carefulness is required to have the spot facings at the same level or of the same depth, and the bushing threads are always of much greater strength than the fastening itself. Also if once fastened, the bushings cannot loosen.

In many instances castings are provided with pads which are finished by planing or grinding to support another piece, which is about as expensive as if an entire surface is planed, owing to the time and handling required. In applying this invention to such structures, it will only be necessary to drill and spot face the pads in the member corresponding to 2 and then to tap the hole for a bolt or stud, or use the headed bolt as herein shown.

It will be seen that this invention utilizes drill press operations instead of planing, as drilling, tapping and spot facing are simple and well understood operations, which are known to be economical as well as rapid and do not require the careful setting up required in a planing operation, and the former generally uses less skilled labor. The former drill press operations of drilling, spot facing, and tapping permit the use of jigs and multiple operations at a very great saving.

Other modifications and changes will be obvious to those skilled in the art, and advisable to meet specific conditions, all of which may be made without departing from the scope of the appended claims.

I claim:

1. A joined metal structure comprising fixed overlapping members, one having a hole therethrough to retain a fastening, the inner surface of said member being spot faced around said hole, the second member having a hole therethrough larger than the fastening and aligned with said first hole, a bushing in the hole in the second member and interlocked therewith, said bushing bearing on the spot faced portion of the first member, and a fastening means carried by said bushing and passing through the hole in the first member for clamping said overlapping members together.

2. A joined metal structure comprising two parts, one having a hole for a fastening spot faced at the inner end and the other carrying an interlocked bushing having its end seated in said spot face and aligned with said first hole, and a fastening passing through said hole and bushing.

3. A joined metal structure comprising two parts having their adjacent surfaces irregular, one part having holes for fastenings spot faced at their inner ends below the adjacent surface irregularities, the other part having corresponding larger threaded holes, bushings threaded in said holes and resting in said spot faces, the bushings being of such effective lengths as to at least substantially equal in holding power the fastening employed, and fastenings passing through said bushings into said holes and holding said parts together.

4. A joined metal structure comprising at least two parts, one having a spot faced portion on one side and the other having a spacing member secured to said other part and seated in the spot faced portion, and means for fastening said parts together.

5. A joined metal structure comprising two members, one of which has a spot faced portion thereon and the other of which is provided with a spacing member rotarily adjustable in height secured thereto and seated in the spot faced portion, and means for clamping the spacing members against the spot faced portion.

6. The method of securing two parts together without using planed surfaces, consisting in providing one part with a hole for the desired fastening member, providing the second part with a larger threaded hole, screwing a threaded bushing into said latter hole until stopped by said first part while holding said parts in predetermined relation with the holes concentric capable of having the inner faces of said parts out of abutment and unfinished, passing a fastening through said bushing in one part and the hole in the other, and setting said fastening.

7. The method of securing two parts together without using planed surfaces, consisting in providing one part with a hole for the desired fastening member, spot facing the inner end of said hole, providing the second part with a larger threaded hole, screwing a threaded bushing into said latter hole until stopped by the spot facing on said first part while holding said parts in predetermined relation with the holes concentric, passing a fastening through said bushing in one part and the hole in the other, and setting said fastening.

8. The method of securing two metal members which comprises spot facing one of said members in a number of places on a side thereof, drilling the other member, threading adjustable spacing members in said other member, and securing said two metal members with the spot faced portions of the first member in cooperation with the spacing members of the second member.

9. A metal structure comprising at least two parts having a number of holes through both of said parts, the side of one part adjacent the other being spot faced around said holes, the holes through the other part being enlarged to contain bushings threaded therein and provided with a finished surface for cooperation with the spot faced portions of the other part, fastening members through said holes for clamping the parts, the bushings being of a length and diameter such that when threaded into a part they exceed in holding power the tensile strength of the fastening passing through said holes.

10. The method of securing metal members which is adapted for fastening members having their adjacent faces unfinished and which comprises drilling a hole through one of said members, spot facing said member around said hole and normal to the axis of said hole, drilling and threading said other member with an aligned hole, screwing a spacing means in said other member for cooperation with the spot faced portion of the first member, and clamping said parts together.

11. A joined metal structure comprising fixed overlapping members, one having a hole therethrough to retain a fastening, the inner surface of said member being spot faced around said hole, the second member having a hole therethrough larger than the fastening and aligned with the first hole, a plurality of bushings of different lengths interlocked with the second member in its hole, the inner of said bushings bearing on the spot faced portion of the first member, and a headed fastening means passing through said bushings and the hole in the first member for clamping said members together.

12. A joined metal structure comprising two members clamped together and adapted to have their adjacent faces unfinished, one of said members being drilled and spot faced on its unfinished surface, the other of said members being drilled and carrying a spacing member in cooperation with the spot faced portion of the first member and within said drilled portion of the second member, and a fastening means within the drilled hole of the first member and through the spacing member of the second member.

Signed at New York city, in the county of New York and State of New York, this 30th day of June, A. D. 1920.

CARL P. ASTROM.